United States Patent [19]

Hayward et al.

[11] Patent Number: 4,949,645
[45] Date of Patent: Aug. 21, 1990

[54] HIGH DENSITY MATERIALS AND PRODUCTS

[75] Inventors: Andrew C. Hayward, Stonnall; Melvyn E. Slater, Cannock, both of England

[73] Assignee: Royal Ordnance Speciality Metals Ltd., London, England

[21] Appl. No.: 192,905

[22] Filed: May 12, 1988

Related U.S. Application Data

[60] Division of Ser. No. 45,714, May 6, 1987, Pat. No. 4,789,981, which is a continuation of Ser. No. 930,988, Nov. 14, 1986, abandoned, which is a continuation of Ser. No. 714,953, Mar. 22, 1985, abandoned, which is a continuation-in-part of Ser. No. 667,894, Nov. 2, 1984, abandoned, which is a continuation-in-part of Ser. No. 536,241, Sep. 27, 1983, abandoned.

[30] Foreign Application Priority Data

Sep. 27, 1982 [GB] United Kingdom ............... 8227505
Jul. 12, 1983 [GB] United Kingdom ............... 8318830
Sep. 22, 1983 [EP] European Pat. Off. ....... 83.305632.8
Sep. 26, 1983 [JP] Japan ............................... 58-176530
Nov. 4, 1983 [GB] United Kingdom ............... 8329526
Mar. 22, 1984 [GB] United Kingdom ............... 8407471

[51] Int. Cl.$^5$ ............................................. F42B 7/04
[52] U.S. Cl. .................................... 102/517; 102/459
[58] Field of Search ............... 102/448, 459, 501, 516, 102/517; 29/1.22, 1.23; 43/44.89, 44.90, 44.91

[56] References Cited

U.S. PATENT DOCUMENTS

| 3,749,016 | 7/1973 | Hershkovitz | 102/517 |
| 3,852,907 | 12/1974 | Haught | 43/44.89 |
| 4,005,660 | 2/1977 | Pichard | 102/517 |
| 4,383,853 | 5/1983 | Zapffe | 102/517 |
| 4,428,295 | 1/1984 | Urs | 102/448 |

OTHER PUBLICATIONS

Powder Metallurgy–Principles and Applications, p. 376 (chart of mesh size vs particle size).

Primary Examiner—Charles T. Jordan
Assistant Examiner—Michael J. Carone
Attorney, Agent, or Firm—Burns, Doane, Swecker & Mathis

[57] ABSTRACT

High density materials, e.g. for fishing weights or pellets or shot as ammunition, are composed of a material comprising high-density metal particles in particular tungsten-containing particles, in a settable or hardenable polymeric matrix providing a composite material of stable configuration. Fishing weights may be produced in known forms, or as flexible tubing to be cut to size by the user, or as a hinged pair of body parts which can be closed together to grip a line between them and to be reopened. For pellets or shot similar materials comprising a polymeric matrix can be provided, or such products can be pressed directly from a tungsten alloy. These products all offer particular advantages of non-toxicity, and the fishing weights can be given the ability to be re-used many times.

15 Claims, 5 Drawing Sheets (a) (b) (c) (d) (e) (f)

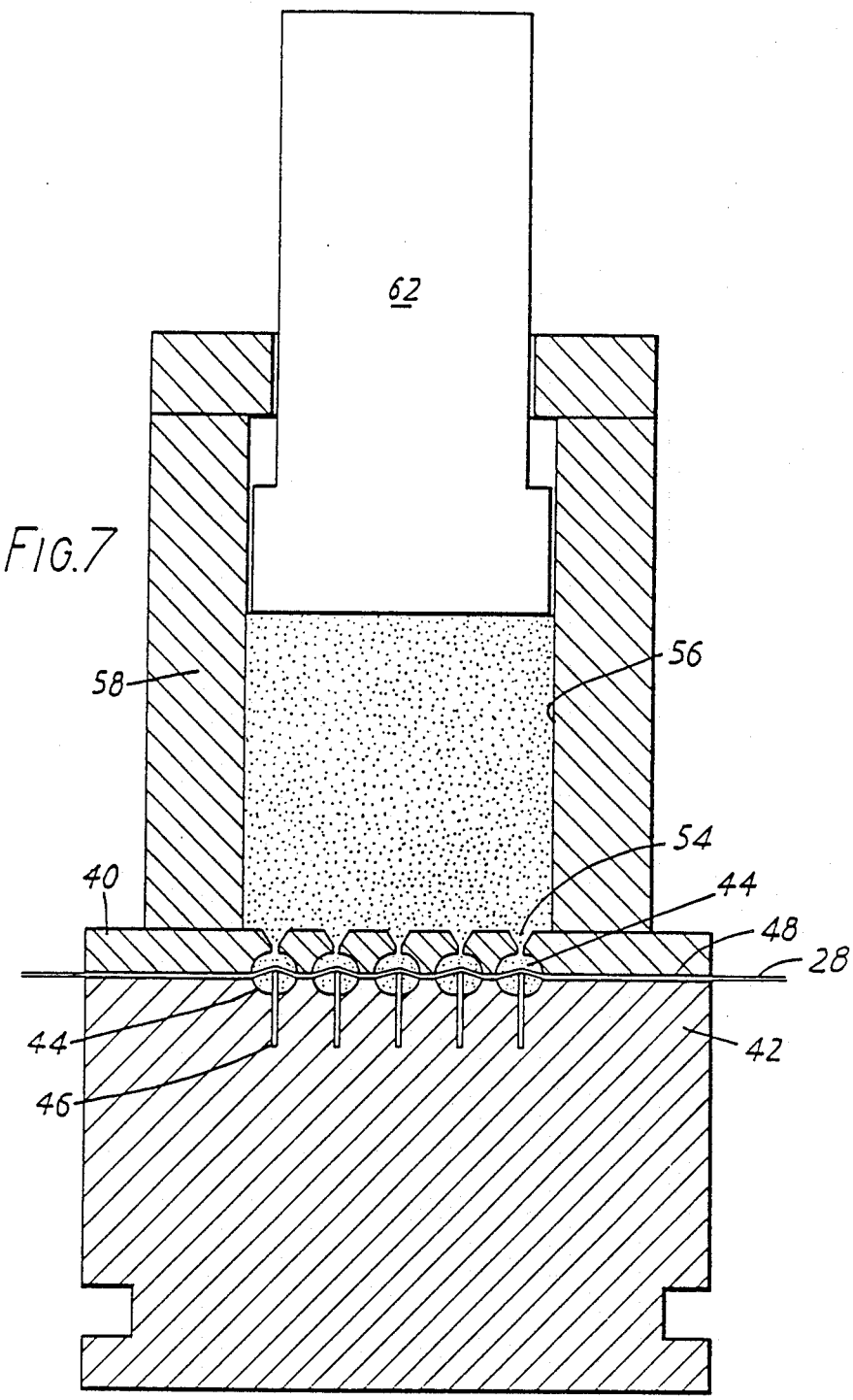

HIGH DENSITY MATERIALS AND PRODUCTS

This application is a divisional, of application Ser. No. 045,714 now U.S. Pat. No. 4,789,481, filed May 6, 1987, which is a continuation of application Ser. No. 930,988, filed Nov. 14, 1986 (now abandoned), which is a continuation of application Ser. No. 714,953, filed Mar. 22, 1985 (now abandoned), which is a continuation-in-part of application Ser. No. 667,894, filed Nov. 2, 1984 (now abandoned), which is a continuation-in-part of application Ser. No. 536,241, filed Sept. 27, 1983 (now abandoned).

FIELD OF THE INVENTION

This invention relates to high density materials and to products formed from such materials. It is concerned particularly, but not necessarily exclusively, with the production of shaped weights, e.g. for fishing lines, and with the production of pellets and shot for ammunition.

BACKGROUND OF THE INVENTION

It is known to sinter and machine such metals as tungsten and its alloys to be used as high-density balancing weights or the like. These are relatively expensive to produce and for many purposes, such as fishing line weights, the more traditional cast lead is used, this material being capable of being deformed by pinching to grip the fishing line. It has also been proposed to manufacture fishing weights by adding lead powder to a settable or mouldable material, to produce a formed weight adapted to have the fishing line tied around it (U.S. Pat. No. 3 192 662) or to produce a pliable mass that is shaped on the line (U.S. Pat. No. 3 638 347 and GB 2 048 631A) or on a tubular core member (U.S. Pat. No. 3 782 025).

The use of lead has a number of disadvantages. Particular concern has been expressed in recent years about the toxic effects of lead on wildlife, particularly near freshwater fishing sites. Also, lead weights particularly in the smaller sizes are awkward to handle and are inconvenient to fix onto or release from a fishing line, because it is necessary to deform the material to clamp it onto the line. As regards the weights proposed in U.S. Pat. No. 3 192 662, these require a degree of dexterity to attach them to a line and each will be suitable for only a narrower range of line thicknesses. The pliable weights that have been proposed are liable to be easily loosened or detached if they encounter an obstacle in the water or due to the forces acting on them when the line is cast.

The release of lead into the wild-life cycle can also occur through the shot of shotgun cartridges, or the pellets of air guns. In this area also there is a need, therefore, for a non-toxic high-density material that can be economically formed to the required shape. Attempts have been made to use steel as a substitute material, but with limited success.

As regards fishing weights, it has also been proposed to make these with a core consisting of a wolframite mass in an outer jacket (U.S. Pat. No. 852 907). Such weights are mainly usable only as sinkers, since they do not grip the fishing line, but a construction is described in the patent specification that allows the weight to be fixedly clamped on the line because the outer jacket is of lead and has a cusp-like indent by which it is crimped onto the line. It may be noted in this last example, therefore, that although a major part of the mass is of wolframite, the outer lead jacket presents substantially the same toxic hazard as a weight made wholly of lead. Moreover, this form of weight will either require considerable force to clamp it firmly onto the line or will be susceptible to gross deformation limiting its capability for reuse.

SUMMARY OF THE INVENTION

According to one aspect of the present invention there is provided a composite material for use as a high density material, e.g. as a weight, comprising particles of tungsten or tungsten alloy mixed with binding matrix material.

According to another aspect of the present invention there is provided a pellet or shot for ammunition formed from a tungsten-rich material. Such a product can be formed from a composite of particles in a binding matrix material, or it can be formed from a tungsten alloy.

According to a further aspect of the present invention, there is provided a weight comprising a mass of metal, preferably tungsten, particles (the term "metal" as used herein including not only metals in their elemental state but also alloys etc.) embedded in a matrix provided by a settable or hardenable, e.g. polymeric, material providing with said metal particles a composite material of stable configuration, the weight being formed with a plurality of main body parts linked by flexible hinge means whereby the parts can be closed together to engage a fishing line or other filamentary element.

When a material according to the invention is formed as a composite of metal particles in a polymeric matrix, in terms of its relative weight the matrix material preferably amounts to not substantially more than 20% of the total. Advantageously it amounts to not more than 10%, and for a maximum density product it amounts to not more than 5% by weight of the total.

In one form of hinged weight according to the invention, the hinge means are provided by a thin integral link of the same material as the main body parts and the body parts themselves may comprise interengaging, e.g. snap-fitting, portions to hold them together releasably. The composition of the weight, especially as regards the polymeric matrix, is chosen so that the hinge means is easily flexible without risk of fracture, whereby a relatively light force is required to fix the weight securely, and moreover the weight is able to be reused without suffering damage or permanent deformation each time it is attached and removed.

In an alternative, the hinge means are formed by the flexible member secured to both body parts to link them. In this form of weight, the body parts may similarly interengage to hold themselves together, but it is also possible to use a material with a high degree of ductility for the hinge means, capable of holding the body parts firmly together when closed and of being reused many times. Conveniently, a strip, or more specifically a wire, of uniform or non-uniform cross-section copper or like ductile metal or alloy is used for the hinge means in this case. The hinge can also be arranged to act as a spring which links the body parts to hold them together by compression forces so that the weight can be held on a fishing line by these forces.

In a preferred method of manufacturing, weights with a separate wire or strip providing the hinge, two mould parts are employed which cooperate to provide between them a series of moulding cavities arranged in at least one row, the hinge strip or wire being laid between the mould parts before they are closed together so that it extends through the cavities of said row, separating means within the cavities projecting into each cavity to one side of the stip or wire therein, whereby the admission of the moulding mass into each space forms the two body parts with a gap between them to one side of the hinge means. The mould cavities can then be arranged in the form of a grid whereby the strips or wires for the hinge means extend through rows of cavities in one direction and bar-like separating means extend through rows of cavities in a direction transverse to said one direction.

BRIEF DESCRIPTION OF THE DRAWINGS

The accompanying drawings illustrate fishing line weights according to the invention that can be made in various sizes, and also methods of manufacturing such weights. In the drawings, FIGS. 6 and 7 are schematic illustrations of a method of manufacturing the weight of FIG. 5.

DESCRIPTION OF THE PREFERRED EMBODIMENTS

Figure 1:
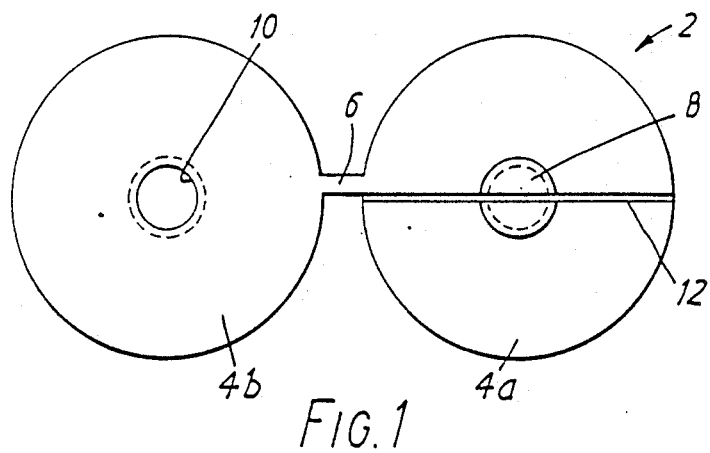
FIG. 1 is a front view of a first form of weight as moulded.
Figure 2:
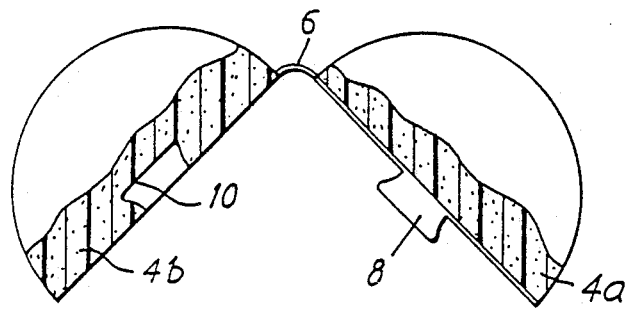
FIG. 2 is an end view showing the weight partly folded.
Figure 3:
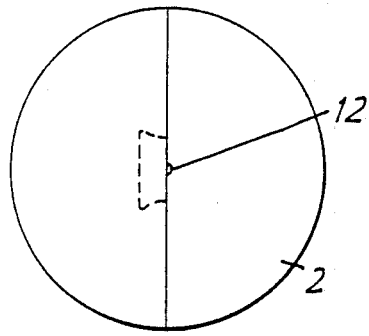
FIG. 3 is a side view of the folded weight.

By way of non-limitative illustration, the following are examples of suitable high density composite materials for weights produced in accordande with the invention:

EXAMPLE 1

Pre-pressed and crushed tungsten powder was sieved in a 100 mesh sieve to remove very fine particles and mixed with silicone rubber, in the proportions 97.1% by weight powder and 2.9% by weight silicone rubber (e.g. that produced under the Trade Mark Silcoset 152 by Imperial Chemical Industries PLC of Great Britain), in a paddle mixer. The resulting mixer could be formed by injection moulding or by extrusion and yielded a resilient material with a specific gravity of 10.6 gm/cc, i.e. close to the density of lead.

EXAMPLE 2

In the process of example 1, 3.8% by weight silicone rubber was added to 96.2% by weight tungsten powder and yielded a material with a specific gravity of 9.6 gm/cc.

EXAMPLE 3

In the process of example 1, 7.2% by weight silicone rubber was mixed with 92.8% by weight tungsten powder to yield a material with a density of 8.8 gm/cc.

EXAMPLE 4

In the process of example 1, 12% by weight silicone rubber was mixed with 88% tungsten powder to yield a material with a density of 6.0 gm/cc. This material exhibits considerable pliability.

EXAMPLE 5

Tungsten or tungsten alloy powder prepared in the manner described in example 1 was mixed with low density polyethylene (e.g. 8503 GUB1 produced by Du Pont of Canada), in the proportions by weight of 96% metal powder and 4% polyethylene. The mix was milled in a ball mill, then transferred to a chamber and heated to 260° C. before being extruded through small orifices. The extruded material was allowed to cool and was broken into small pieces to provide a suitable feed material for an injection moulding process. The material had a density of 9.6 gm/cc.

Other settable or hardenable materials, in particular polymeric materials, can be used as the matrix for the metal powder provided a suitably stable configuration results and metals other than tungsten can be used to the extent that they yield a product with a sufficiently high specific gravity. In general, a satisfactory product will require not substantially less than 2.5% by weight of the matrix material, but the upper limit is set only by the minimum acceptable density of the final material. If flexibility of the composite material is a required characteristic, the minimum proportion of matrix material will have to be higher, e.g. not substantially less than 8% by weight.

It is also possible to produce a composite matrix/metal material for the use in the invention having a two-part polymer/hardener as the matrix material. In that case, the metal powder may be mixed with one part of the matrix material before the remaining part is added.

Referring now to FIGS. 1 to 4 of the accompanying drawings, a fishing weight 2 comprises two hemispherical parts 4a, 4b linked by a thin integral strip 6, one of the parts being provided with a central necked pip 8 and the other with a mating recesss 10 for the pip. Across the inside face and pip of the first part 4a there runs a slot 12 to receive the fishing line. The weight is moulded from a material such that described in the foregoing Examples 1 to 3. As a result, the connecting strip between the hemispherical parts has considerable flexibility so that the two parts can be easily folded together. This same elasticity is exhibited by the central pip 8 and the circumferential wall of its receiving recess 10 so that the parts can then be easily snap-fitted together to secure the weight firmly to the line in such a way that it can be repeatedly slid to the required position and be held there frictionally. When it is required to remove the weight the parts can be equally easily opened again without damage to the weight or the line.

Figure 4:
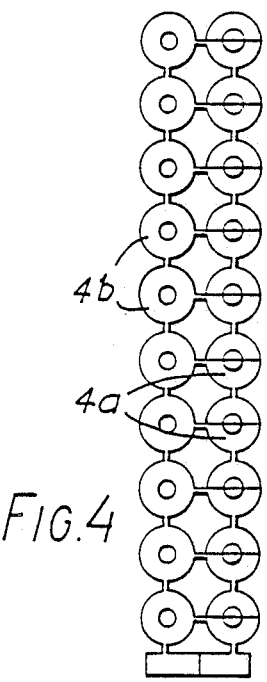
FIG. 4 illustrates one way in which a series of such weights can be formed as an injection moulding.

As FIG. 4 illustrates, it is possible to provide a mould in which a series of such weights are moulded simultaneously by the one injection stroke, so reducing production costs.

Depending upon the matrix material, a cold setting moulding process can be used, or the setting can be assisted by heat.

Figure 5:
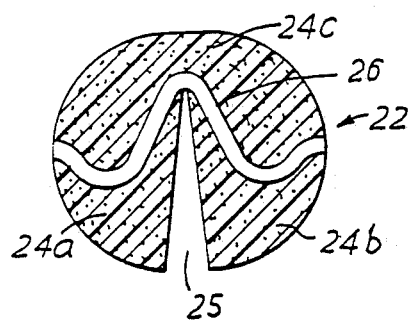
FIG. 5 is a sectional view of another form of weight.

FIG. 5 illustrates a second form of weight 22, similarly comprising two substantially hemispherical main body parts 24a, 24b joined by a narrower intermediate portion 24c, a wedge-form gap 25 of about 12° being formed across the major part of the diametrical section of the weight in the central hinge plane. A copper wire 26 of 0.4 mm diameter extends across the narrower intermediate portion and into both body parts to form a hinge between the body parts.

When a fishing line is placed in the gap and the body parts are pressed together, the copper wire provides a hinge pivot to close the body parts onto the line. Because of the use of a flexible wire as a hinge the moulded mass that forms the main body parts may be relatively inelastic and even brittle, so that the portion 24c in the region of the central hinge plane fractures as the copper wire is flexed. The flexural strain on the small exposed portion of the wire deforms it plastically so that the line is firmly gripped. The high ductility of the copper allows the hinge joint to be opened and closed many times so that the weight can be reused. Of course, if the material of the body parts is sufficiently resilient they can be provided with interengaging elements similar to the example of FIGS. 1–3.

Figure 6:
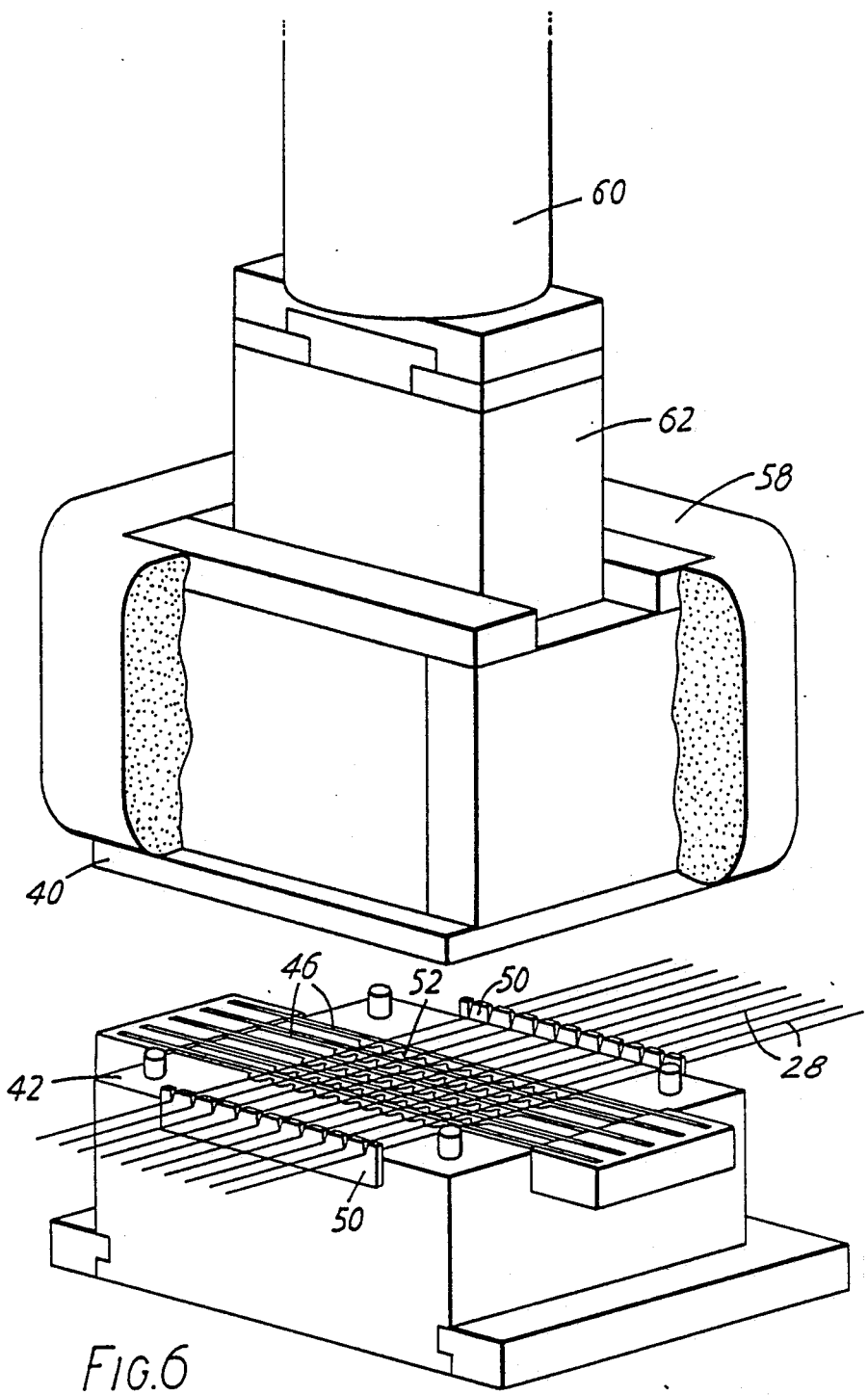

The weight illustrated in FIG. 5 has been manufactured by the method illustrated in FIGS. 6 and 7 where an injection moulding machine is shown for producing a large number of weights simultaneously. Upper and lower mould parts 40, 42 have mating, substantially hemispherical recesses 44 arranged in rows on a rectangular grid. Running along the rows in one direction, through the centres of the recesses in the lower mould part, are a series of separating blades 46. These blades have a wedge-form cross-section with the apex at approximately three quarters the height of the mould.

Shallow grooves 48 run across the top face of the lower mould half at right angles to the blades to intersect the rows of recesses at the centres of the recesses. In these grooves lengths of copper wire 28 run out from spools (not shown) are laid under tension across the top face of the mould half 42, through guides 50. Notches 52 in the blades accommodate the wires where they cross so that each blade extends slightly above the wires in the spaces between the wires.

The upper mould half has a series of exit nozzles 54 from a charge chamber 56 to which it is secured and which is encased in a heating jacket 58. The material to be moulded is prepared for the charge chamber in the form of pellets of the powdered metal mixed in a plastics matrix, a suitable material being that described in Example 4 above. In the charge chamber this material is reheated to 260° C. and under pressure is forced by a ram 60, on which charge plunger 62 is mounted, into the mould cavities in a fluid state. As a result of the pressure of the entering material, the copper wire is stretched to the bowed shapes shown in FIG. 5, so that the hinges are firmly anchored in the main mass of the material forming the body parts.

When the mould is opened the weights may be removed as a single array with the individual weights held together by the lengths of wire in one direction and by flashes of moulding material in a direction at 90° to the wire. The individual weights can then be separated as required.

Referring again to FIG. 5, it will be noted that because of the projection of the apex of the blade above the wire hinge to some three quarters of the height of the weight, in the central hinge plane the moulded material will only occupy a small area to one side of the wire and spaced therefrom except for a minimal region corresponding to the notch in the separting blade for the width of the wire. When finger pressure is applied to the body parts to close them onto a fishing line, therefore, the moulded mass in the central hinge plane is subjected to tensile forces which, having regard to the high powder content of the mass and the nature of the matrix material, causes it to fracture easily and leave the copper wire as the sole effective hinge element. Only a minimal length of wire is not constrained by being embedded in the moulded mass and the hinging flexure will therefore be confined to a small region with the result that plastic deformation will occur and ensure that the fishing line inserted in the wedge-like gap is firmly gripped. The high ductility of copper nevertheless ensures that the hinge can be opened and closed many times to allow the weight to be reused.

Figure 8:
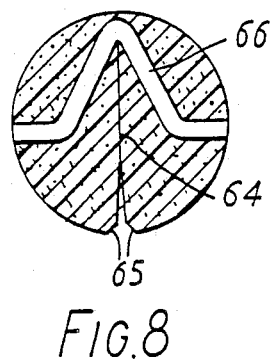
FIG. 8 is a sectional view of another form of weight.
Figure 9:
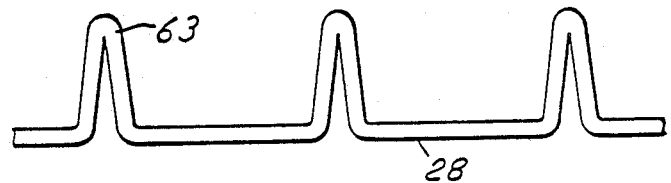
FIGS. 9 and 10 are schematic illustrations of the method of manufacturing the weight of FIG. 8.
Figure 10:
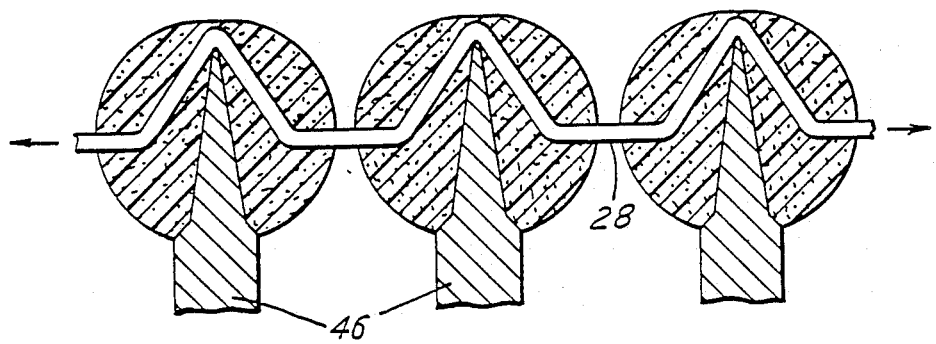

The weight illustrated in FIG. 8 has been manufactured by the method illustrated in FIGS. 9 and 10 using apparatus similar to that shown in FIGS. 6 and 7, but where the strip or wire 28 is now made of a spring material of uniform or non-uniform cross-section shaped as shown in FIG. 9 with a series of spaced corrugations 63. In this case the spring material is pre-tensioned before moulding thus ensuring that on completion of manufacture each corrugation acts as a spring 66 and the two faces 64 of the weights so made are under compression, being pulled together by the spring. The blades 46 are so shaped that there is a groove or rebate 65 on the outer edge of the slot when the faces 64 come together. This enables the weight to be pushed onto a fishing line or other filamentary element with positional stability being maintained by the frictional forces generated from the compressive load exterted by the spring 66. This self-gripping form of weight can be re-used many times.

In each of the examples illustrated above, in order to grip a fishing line more securely the opposed faces (64 in FIG. 8) of the body parts may be roughened, e.g. by moulding ridges or other contouring on these faces.

Weights can be moulded to other described shapes, not necessarily incorporating hinge means, for a variety of purposes using mixtures such as those given in Examples 1 to 4.

Because the material described can be formed by moulding or extrusion, it is possible to produce a great variety of shapes economically for many different uses. The examples illustrated yielded a composite material that has a stable form and a greater or lesser degree of resilience. More rigid products can be made, e.g. by appropriate choice of the matrix material and the proportion of it used and it is also possible to use a synthetic resin in sufficiently high proportion to produce a composite material that remains pliable to be shaped and reshaped by the user.

Figure 11:
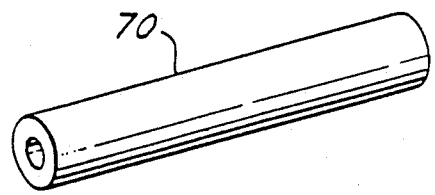
FIG. 11 illustrates another form of weight formed by extrusion.
Figure 12:
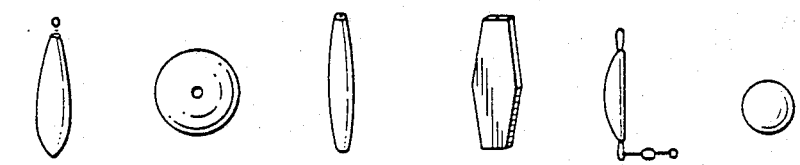
FIG. 12 illustrates a selection of other products of known form that can be produced from a material according to the invention.

By way of further example the material can be formed as a tube 70 (FIG. 11), e.g. by extrusion. A ledger stop for a fishing line can be provided by a length of tubing, preferably flexible, with an appropriate plug. In fact, in such an application either the tube of the plug or both can be made from a material according to the invention. Furthermore, a length of flexible tubing such as is illustrated in FIG. 11, of a material accoridng to the invention, e.g. of the material of Example 4, can replace a range of split shot weights: the product can be supplied as an extruded length to the cut by the user as required. An advantage in the use of flexible tubing for ledger weights is that the weight is less likely to become jammed on underwater obstructions. As an alternative to the hinged weights already described, the tubing is particularly suitable for smaller sizes of weight. For this purpose the tubing may thus be extruded with an internal diameter of about 0.6 mm and an external diameter down to 2 mm. Generally, for use as fishing weights, the tubing may be produced in a range of cross-sections up to about 9 mm external diameter, the internal diameter being kept the same, however, to grip the line, and the extrusions can be cut into convenient pieces of elongate tubing from which the user will cut the lengths of tube he requires.

Harder grade of material according to the invnention than that for the flexible tubing can be used for such fishing weights as coffin weights, barrel weights, Arlsley bombs and bullet weights; a variety of such weights are illustrated in FIG. 12(a) to (e).

As already indicated, the composite materials of the present invention, in which a high density metallic component is held in a settable matrix can also be used for pellets and shot (FIG. 12f), but for this purpose it may be preferred to form the product directly from a tungsten alloy. The tungsten content of such an alloy can vary over a wide range, although it is usually not more than 97% by weight unless precautions are taken to prevent damage by abrasion of the gun barrel, while there should preferably be at least 40% by weight for the shot or pellet to have a sufficiently high density. The following examples are illustrative of preferred materials:

EXAMPLE 6

An alloy is composed in the porportions by weight, of tungsten 90%, nickel 7½%, copper 2½%. Shot that is formed, e.g. by pressing from the powdered constituents and sintering, has a density substantially greater than that of lead shot, and ammunition having the same propellant and shot charge will have a greater range than lead. An otherwise conventional cartridge using such shot can-be made more compact because of the smaller volume occupied by a given mass of shot and propellant.

EXAMPLE 7

Shot is pressed and sintered from constituents in the proportions by weight of 50% tungsten, 35% nickel and 15% copper. The alloy has a density similar to that of lead shot and can be used as a direct substitute therefor.

By providing an alloy with a 70% tungsten content by weight, i.e. a value between those in the last two examples, a specific gravity in the region of 14 gm/cc can be obtained without undue sacrifice of other qualities. In all these alloys, a variety of other metals can be used as alloying constituents in combination with or in place of nickel and/or copper.

In these latter examples the shot can of course be of known shape and the pressing and sintering operations can be conventional in themselves, so that more detailed description is unnecessary.

It will in general be possible to produce higher density pellets or shot from a tungsten alloy rather than using a composite material with a polymeric matrix, but the composite material can be given a density comparable to that of lead and can be more economically produced. The material of any of the examples 1-4 can be used for this product.

Whether using an alloy or polymer-based mix, moulds are preferably used to produce the shot or pellets in the required sizes, and preferably in spherical form. After removal from the moulds, any moulding flash that may have been formed at the meeting faces of the mould parts can be removed from the product, e.g. by tumbling.

It is alternatively possible to form the shot or pellets by extrusion through small orifices, chopping the extruded strands and tumbling. When using shot according to the invention to make up a shotgun cartridge, the other elements of the cartridge can be conventional and the cartridge can be otherwise manufactured in a conventional manner, so that no further description is required here.

We claim:

1. A shotgun pellet or shotgun shot for use in a shotgun cartridge, said shotgun pellet or shotgun shot being formed from a tungsten-rich material that comprises tungsten and a settable plastics material.

2. A shotgun pellet or shotgun shot according to claim 1, wherein said tungsten-rich material includes a tungsten alloy having a tungsten content of between 40% and 97% by weight.

3. A shotgun pellet or shotgun shot according to claim 2 containing between 50% and 90% tungsten by weight.

4. A shotgun pellet or shotgun shot according to claim 2, wherein the tungsten-rich material includes an alloy of tungsten that contains an alloying constituent selected from the group of (i) nickel, (ii) copper, (iii) nickel and copper.

5. A shotgun pellet or shotgun shot according to claim 4, wherein the alloy of tungsten includes 90% tungsten by weight with the remainder being said alloying constituent.

6. A shotgun pellet or shotgun shot according to claim 4, wherein the alloy of tungsten includes 70% tungsten by weight with the remainder being said alloying constituent.

7. A shotgun pellet or shotgun shot according to claim 4, wherein the alloy of tungsten includes 50% tungsten by weight with the remainder being said alloying constituent.

8. A shotgun pellet or shotgun shot according to claim 1, wherein the plastics matrix is silicone rubber.

9. A shotgun pellet or shotgun shot according to claim 1, wherein the particles are at least of a size as to be retained by a 100 mesh sieve.

10. A shotgun pellet or shotgun shot according to claim 1, wherein the relative amounts of tungsten and the material lighter than lead result in a tungsten-rich material having a density at least substantially equal to that of a lead.

11. The shotgun pellet or shotgun shot according to claim 1, wherein the density of the shotgun pellet or shotgun shot is greater than the density of lead.

12. The shotgun pellet or shotgun shot according to claim 1, wherein the density of the shotgun pellet or shotgun shot is substantially equal to lead.

13. A shotgun cartridge containing a charge of a propellant together with shot formed from a tungsten-rich material that comprises tungsten and a non-toxic material that is lighter than lead, said non-toxic material being a settable plastics material.

14. A shotgun pellet or shotgun shot according to claim 1, wherein the plastics matrix is a polyethylene.

15. A shotgun cartridge, comprising: a charge of propellant and a plurality of pellets formed from a tungsten-rich material that comprises particles of tungsten in a settable plastics material.

* * * * *